United States Patent [19]

Iijima

[11] Patent Number: 5,611,131

[45] Date of Patent: Mar. 18, 1997

[54] AUTOMATIC BOOT MOUNTING APPARATUS

[75] Inventor: Yoichi Iijima, Nagano, Japan

[73] Assignee: Nissin Kogyo Co., Ltd., Nagano, Japan

[21] Appl. No.: 473,924

[22] Filed: Jun. 7, 1995

Related U.S. Application Data

[62] Division of Ser. No. 242,876, May 16, 1994, Pat. No. 5,457,865.

[30] Foreign Application Priority Data

Jul. 23, 1993 [JP] Japan .................................. 5-183017

[51] Int. Cl.⁶ ...................................................... B23P 19/04
[52] U.S. Cl. ........................................... 29/235; 29/281.5
[58] Field of Search .................................. 29/235, 421.1, 29/434, 450, 451, 789, 797, 281.5

[56] References Cited

U.S. PATENT DOCUMENTS

| | | |
|---|---|---|
| 3,866,299 | 2/1975 | Gregg et al. . |
| 4,677,872 | 7/1987 | Nishida et al. . |
| 4,884,327 | 12/1989 | Nagatsuma et al. . |
| 5,008,994 | 4/1991 | Rettig et al. . |

FOREIGN PATENT DOCUMENTS

| | | |
|---|---|---|
| 0161170 | 12/1979 | Japan . |
| 228015 | 6/1990 | Japan . |
| 361859 | 9/1991 | Japan . |
| 3208528 | 9/1991 | Japan . |
| 4105643 | 9/1992 | Japan . |

*Primary Examiner*—Joseph M. Gorski
*Attorney, Agent, or Firm*—Whitham, Curtis, Whitham & McGinn

[57] ABSTRACT

In an automatic boot mounting method or an apparatus for practicing the method, a wheel cylinder is held at a predetermined position, and a boot is mounted on the tapered shaft portion of an inserter. The small-diameter shaft portion of the inserter is held with an inserter moving device with the large-diameter shaft portion of the inserter faced to the cylinder body. With the inserter set along the central axis of the cylinder body, the boot is moved to the large-diameter shaft portion of the inserter by a guide plate. The inserter is moved along the central axis of the cylinder body by the inserter moving device until the end face of the large-diameter shaft portion abuts against the end face of the protrusion end portion of the piston. A first air supplying device supplies air into the boot, to inflate the boot, to fit the large-diameter sealing portion of the boot in a seal groove formed in the cylinder body, and a second air supplying device supplies air into the hydraulic pressure chamber in the cylinder body, to move the piston thereby to fit the small-diameter sealing portion of the boot in a sealing groove formed in the piston. Thus, the large-diameter sealing portion and the small-diameter sealing portion of the boot can automatically be fitted in the sealing grooves formed in the cylinder body and the piston.

8 Claims, 6 Drawing Sheets

AUTOMATIC BOOT MOUNTING APPARATUS

This is a divisional application of application Ser. No. 08/242,876 filed May 16, 1994 and now U.S. Pat. No. 5,457,865.

BACKGROUND OF THE INVENTION

The present invention relates to an apparatus for mounting a boot on a cylinder such as a wheel cylinder for a vehicle brake drum and a hydraulic pressure master cylinder which pressurizes an operating liquid and supplies the operating liquid thus pressurized to the wheel cylinder in such a manner that the boot covers the opening of the cylinder hole.

More particularly, the present invention relates to a boot mounting apparatus with which the annular sealing portions of a boot are automatically fitted in the sealing grooves of a piston and a cylinder body from outside, and to a method of mounting a boot with the apparatus.

One example of a cylinder in which a boot is mounted on a cylinder body and a piston in the cylinder hole of the cylinder body to cover the opening of the cylinder hole is a wheel cylinder for a vehicle drum brake (cf. Unexamined Japanese Utility Model Publication (OPI) No. Hei. 4-105643).

In the wheel cylinder, sealing grooves are formed in the outer cylindrical surface of the cylinder body and in the cylindrical surface of the protruded end portion of the piston, and the annular sealing portions of a boot are fitted in the sealing grooves thus formed. In order to automatically fit the sealing portions of the boot in the sealing grooves, various apparatuses and methods have been proposed, for instance, by Examined Japanese Patent Publication No. Hei. 3-61859, Unexamined Japanese Patent Publication (OPI) No. Hei. 3-208528, and Examined Japanese Patent Publication No. Hei. 2-28015.

The apparatus or method disclosed by the aforementioned Examined Japanese Patent Publication No. Hei. 3-61859 is of the outside fitting type that the annular sealing portion is fitted in the sealing groove from outside. The apparatus or method disclosed by the aforementioned Unexamined Japanese Patent Application (OPI) No. Hei. 3-208528 is of the inside fitting type that the annular sealing portion is fitted in the sealing groove from inside. That is, the two prior art apparatuses and methods are applicable to the fixing of only one of the annular sealing portions.

On the other hand, the aforementioned Examined Japanese Patent Publication No. Hei. 2-28015 is applicable to the fixing of both of the annular sealing portions. However, the prior art is still disadvantageous in the following point. The prior art is the combination of the outside fitting type and the inside fitting type that one of the annular sealing portions is fitted in the sealing groove from outside, and the other is fitted in the sealing groove from inside. Hence, it cannot be applied to a cylinder such as a wheel cylinder for a vehicle drum brake in which both of the annular sealing portions are fitted in the sealing grooves from outside. Therefore, heretofore the annular sealing portions are manually fitted in the sealing grooves, taking time and labor.

SUMMARY OF THE INVENTION

In view of the foregoing, an object of the present invention is to provide an apparatus in which two annular sealing portions of a boot are automatically fitted in sealing grooves of a cylinder body and a piston from the outside with high efficiency.

To achieve the foregoing object and other objects of the present invention, an automatic boot mounting apparatus is of the type that the large-diameter sealing portion of a boot is fitted in an annular sealing groove formed in the cylindrical surface of a cylinder body while the small-diameter sealing portion of the boot is fitted in an annular sealing groove formed in the cylindrical surface of the protruded end portion of a piston accommodated in the cylinder hole of the cylinder body, so that the opening of the cylinder hole is covered with the boot. The automatic boot mounting apparatus of the present invention is provided with: a jig for holding the cylinder body at a predetermined position; an inserter including a large-diameter shaft portion which is equal in diameter to the protruded end portion of the piston, a small-diameter shaft portion which is smaller in diameter than the small-diameter sealing portion of the boot, and a tapered shaft portion between the large-diameter shaft portion and the small-diameter shaft portion, the inserter having an air passageway axially extended therein; an inserter moving device for holding the small-diameter shaft portion of the inserter, and moving the inserter back and forth along the central axis of the cylinder body with the large-diameter shaft portion faced towards the cylinder body; a guide plate adapted to move the boot mounted on the tapered shaft portion to the large-diameter shaft portion; a guide plate moving device for moving the guide plate back and forth along the central axis of the cylinder body; a first air supplying device for supplying air through the air passageway of the inserter into a space between the piston and the boot, to inflate the boot outwardly to fit the large-diameter sealing portion in the sealing groove of the cylinder body; and a second air supplying device for supplying air into the cylinder hole, to push the piston in the cylinder hole outwardly to fit the small-diameter sealing portion in the sealing groove of the piston.

An automatic boot mounting method for use with the present invention is provided with the steps of: providing the inserter including the large-diameter shaft portion which is equal in diameter to the protruded end portion of the piston, the small-diameter shaft portion which is smaller in diameter than the small-diameter sealing portion of the boot, the tapered shaft portion between the large-diameter shaft portion and the small-diameter shaft portion, and the air passageway extended axially in the inserter; moving the small-diameter sealing portion of the boot from the tapered shaft portion of the inserter to the large-diameter shaft portion of the inserter; moving the boot and the inserter towards the cylinder body so that the large-diameter shaft portion of the inserter abuts against the protruded end portion of the piston; supplying air through the air passageway of the inserter into the space between the boot and the piston, to inflate the boot outwardly so as to fit the large-diameter sealing portion in the first annular groove of the cylinder body; and supplying air into the cylinder hole to push the piston in the cylinder hole outwardly so as to fit the small-diameter sealing portion of the boot in the second annular groove.

The nature, utility and principle of the invention will be more clearly understood from the following detailed description and the appended claims when read in conjunction with the accompanying drawing.

DETAILED DESCRIPTION OF THE INVENTION

Figure 1:
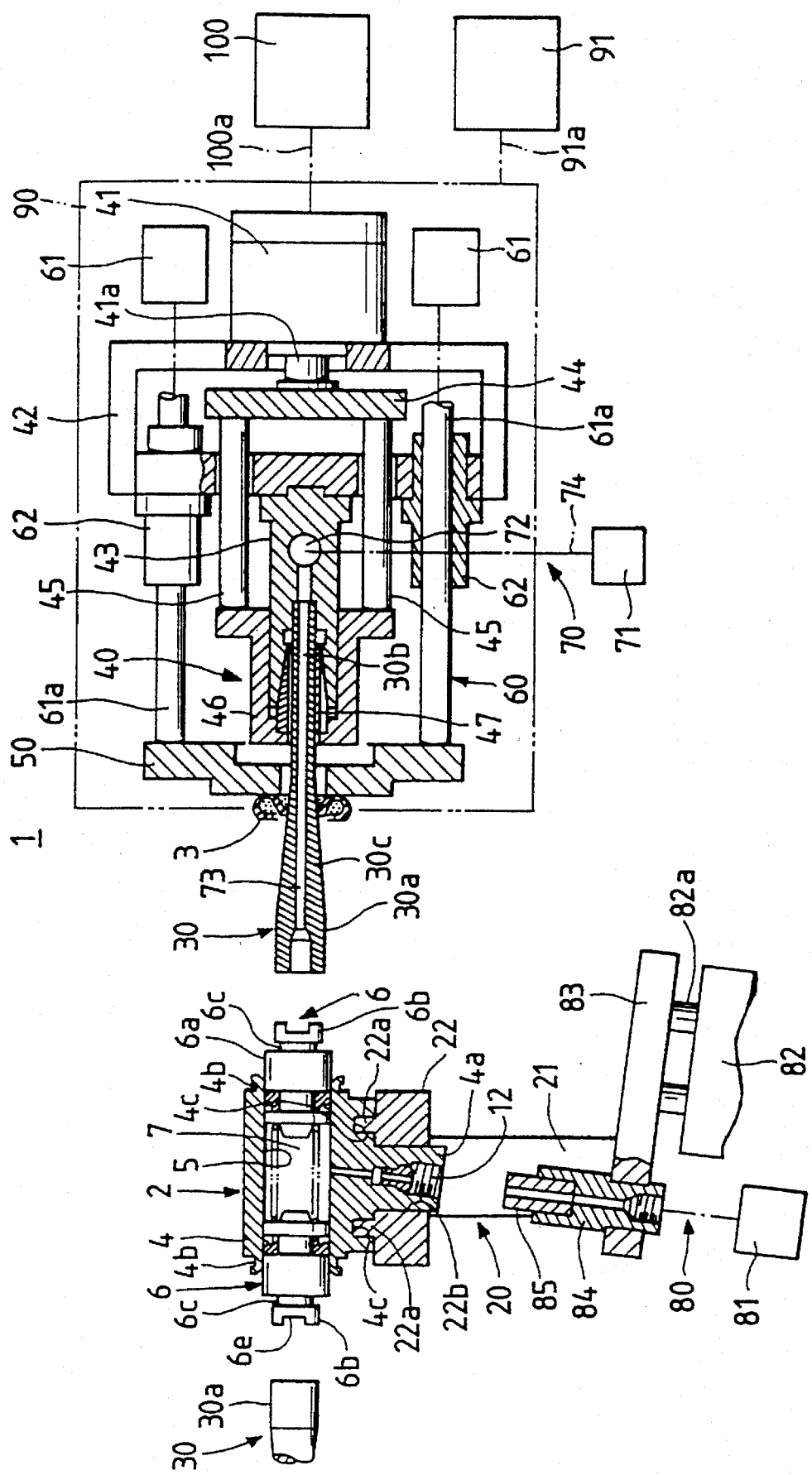
FIG. 1 is a diagram showing the whole arrangement of an automatic boot mounting apparatus, which constitutes an embodiment of the present invention.

A preferred embodiment of the present invention applied to a wheel cylinder for a vehicle drum brake will be described with reference to the accompanying drawings.

As shown in those drawings, the wheel cylinder 2 is a hydraulic pressure type actuator for a drum brake. The wheel cylinder 2 includes a cylinder body 4 having a through-hole, namely a cylinder hole 5. Pistons 6 and 6 are arranged in the cylinder hole 5 in such a manner that they are protruded outside from the cylinder body 4 through both end openings of the cylinder hole 5, thus defining a hydraulic pressure chamber 7 therebetween. An operating liquid is supplied into the hydraulic pressure chamber 7 to push out the pistons 6 and 6 to move brake shoes 8 and 8 away from each other which are engaged with slits 6e formed in the pistons 6, thereby to perform a braking operation. The cylinder body 4 is mounted on the back plate 10 of the drum brake 9 with fixing bolts 11 and 11, with its union boss 4a protruded outside through the back plate 10.

The union boss 4a has a union hole 12 which is communicated with the hydraulic pressure chamber 7. A pressurized operating liquid is supplied into the hydraulic pressure chamber 7 through a union bolt (not shown) engaged with the opening of the union hole 12. Each piston 6 includes a cylindrical body 6a which is adapted to slide in the cylinder hole 5 and has a sealing groove 6d in the cylindrical surface. A cup seal 13 is fitted in the sealing groove 6d to make the hydraulic pressure chamber 7 liquid-tight. A boot 3 is set over a protruded end portion 6b having a small diameter which is extended from the cylindrical body 6a laterally of the cylinder body 4, in such a manner as to cover the cylindrical surface of the end portion of the cylinder body 4, so as to prevent the entrance of water or dust into the cylinder hole 5.

One end portion of the boot 3 is formed into a large-diameter annular sealing portion 3a, and the other end portion is formed into a small-diameter annular sealing portion 3b. With an automatic boot mounting apparatus 1, the large-diameter annular sealing portion 3a is automatically fitted in a sealing groove 4b formed in the cylindrical surface of the cylinder body 4, while the small-diameter annular sealing portion 3b is automatically fitted in a sealing groove 6c formed in the cylindrical surface of the protruded end portion 6b.

The automatic boot mounting apparatus 1 is provided with a jig 20 for holding the wheel cylinder 2, an inserter 30 for guiding the mounting of the boot 3, an inserter moving device 40 for moving the inserter 30 to a predetermined mounting position, a guide plate 50 for moving the boot 3 into which the inserter 30 is inserted, a guide plate moving device 60 for moving the guide plate 50, a first air supplying device 70, and a second air supplying device 80.

One set of the above-described components 30, 40, 50, 60, 70 and 80 are provided on one side of the jig 20, and another set of the same components 30 through 80 are provided on the other side of the jig 20, so that two boots 3 and 3 can be mounted on both ends of the wheel cylinder 2, respectively, at the same time. Those components 30 through 80 on both sides of the jig 20 are arranged symmetrically with respect to the jig 20. Hence, for simplification in description, only the components 30 through 80 on the right-hand side of the jig 20 will be described.

The jig 20 includes a plate-shaped stand 22 fixedly mounted on top of a guide support 21. The plate-shaped stand 22 has a pair of guide bosses 22a and 22a, and a guide hole 22b. The wheel cylinder 2 is fixed as follows: The guide bosses 22a and 22a are engaged with female-threaded holes 4c and 4c of the cylinder body 4 into which the fixing bolts 11 are screwed. With the union boss 4a engaged with the guide hole 22b, the wheel cylinder 2 is positioned on the upper surface of the stand 22. Under this condition, a clamping device (not shown) is used to fix the wheel cylinder 2.

The inserter 30 is substantially in the form of a tapered shaft. The inserter 30 includes: a large-diameter shaft portion 30a which is equal in diameter to the protruded end portion 6b of the piston 6, and is larger in diameter than the small-diameter annular sealing portion 3b of the boot 3; a small-diameter shaft portion 30b which is smaller in diameter than the small-diameter sealing portion of the boot 3; and a tapered shaft portion 30c between the above-described shaft portions 30a and 30b. The inserter 30 has a through-hole, namely, a second air passageway 73 along the axis which is a part of the first air supplying device 70. The boot 3 is mounted on the inserter 30 as follows: With the large-diameter sealing portion 3a of the boot 3 on the side of the large-diameter shaft portion 30a of the inserter 30, the inserter 30 is inserted into the boot 3 beginning from the small-diameter shaft portion 30b until the small-diameter sealing portion 3b is caught by the tapered shaft portion 30c at a portion where the diameter of the tapered shaft portion 30c is equal to that of the small-diameter sealing portion 3b. Thus, the boot 3 has been mounted on the inserter 30.

An inserter moving device 40 includes: a first operating cylinder 41 for a collet cap 46; a collet holder 43 which, together with the operating cylinder 41, is fixedly secured to a bracket 42; a pair of joints 45 and 45 which are held through a coupling board 44 on the push rod 41a of the first operating cylinder 41; the aforementioned collet cap 46 which is held on the front ends of the joint rods 45 and 45 to cover the front end portion of the collet holder 43; and a collet 47 which is set not only inside the cap 46 but also inside the collet holder 43.

The collet holder 43, the collet cap 46, and the collet 47 are arranged coaxially with the cylinder body 4. The joint rods 45 and 45 are parallel with the central axis of the cylinder body 4. The collet cap 46 is reciprocated along the central axis of the cylinder body 4 by the push rod 41a which is moved back and forth by the first operating cylinder 41.

The collet holder 43 has a tapered hole 43a for accommodating the collet 47, and a first air passageway 72 which is a part of the first air supplying device 70. The collet 47 is a kind of chuck which is formed by cutting a plurality of slits in both end portions of a conical member alternately so as to be expandable and contractible. That is, the collet 47 has a tapered cylindrical outer surface 47a, through which the collet 47 is inserted into the tapered hole 43a of the collet holder 43. The collet 47 has an inserting through-hole 47b, into which the small-diameter shaft portion 30b of the inserter 30 is inserted. More specifically, the small-diameter shaft portion 30b is inserted until its front end comes in the first air passageway 72.

Figure 2:
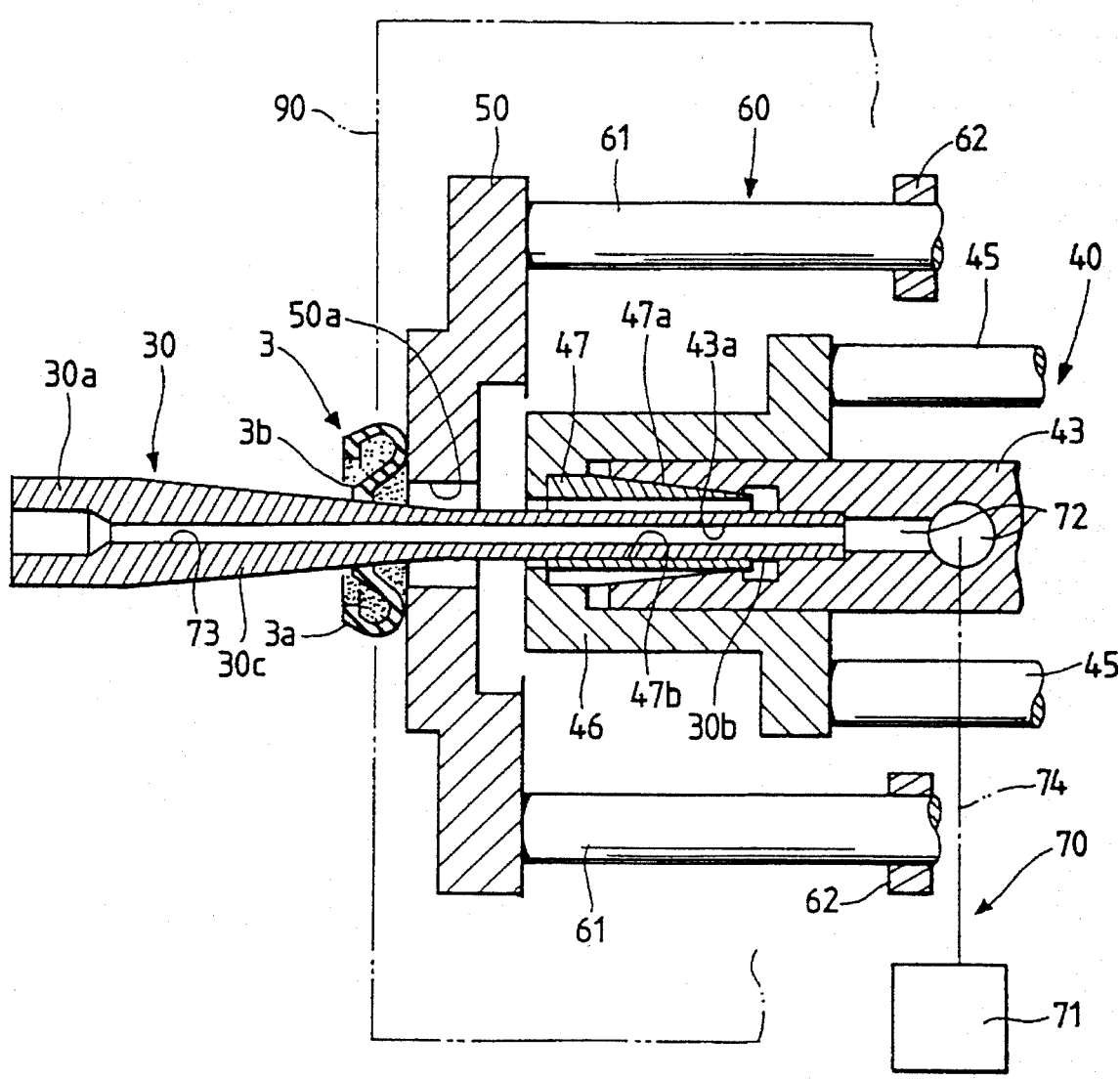
FIG. 2 is an enlarged diagram of essential components of the apparatus shown in FIG. 1.
Figure 3:
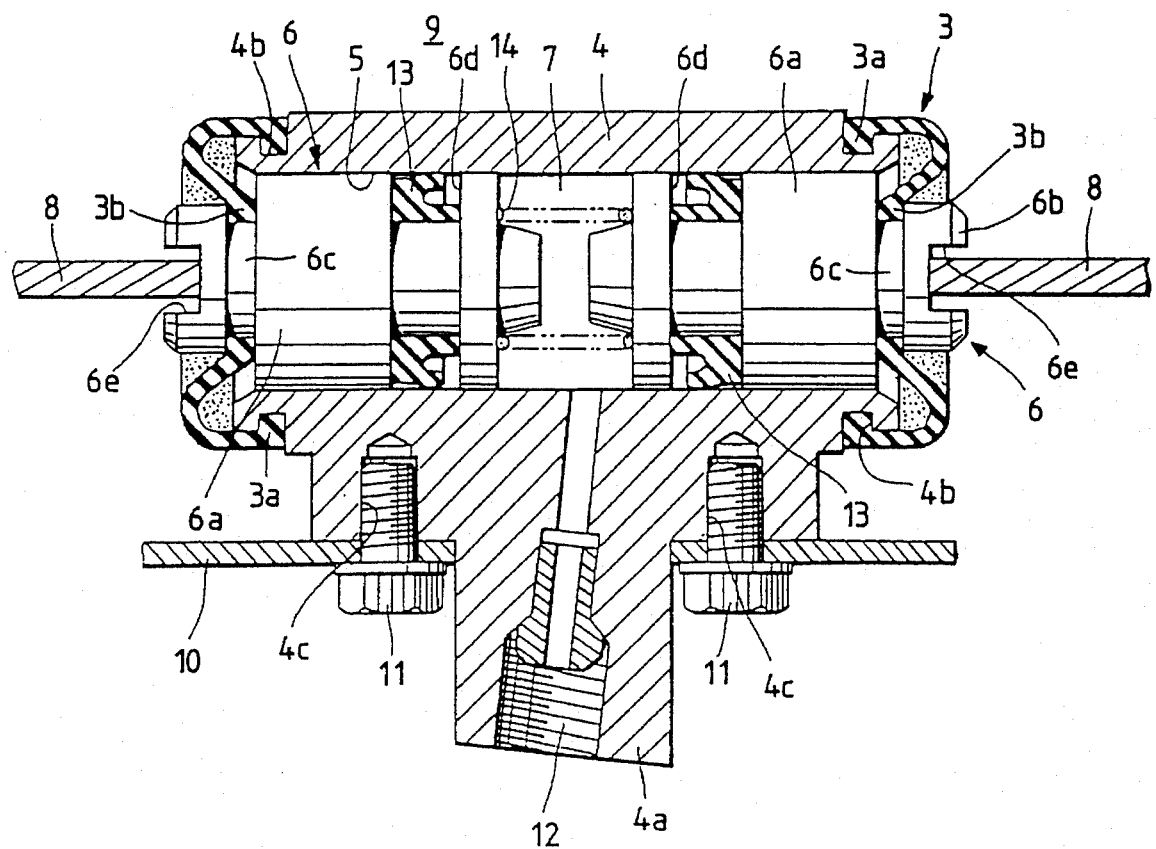
FIG. 3 is a sectional view of a drum brake's wheel cylinder on which boots are mounted with the apparatus according to the present invention.

As the collet cap 46 is moved to the right in FIG. 1 or 2 by the operation of the first operating cylinder 41, the collet 47 into which the small-diameter shaft portion of the inserter 30 has been inserted is pushed into the collet holder. In this operation, the diameter of the collet 47 is gradually decreased by the tapered hole 43a of the collet holder 43; that is, the collet 47 grips the small-diameter shaft portion 30b of the inserter. As the collet cap 46 is moved to the left-handed side in FIG. 1 or 2, the collet 47 is gradually expanded while moving away from the collet holder, which permits the removal of the small-diameter shaft portion 30b of the inserter 30.

The guide plate 50 is hat-shaped in section, with its central portion protruding toward the wheel cylinder 2. The guide plate 50 has an inserting through-hole 50a whose diameter is substantially equal to that of the large diameter shaft portion 30a of the inserter 30. The small-diameter shaft portion 30b of the inserter 30 is inserted through the inserting through-hole 50a and the inserting through-hole 47b of the collet 47 into the collet holder 43.

The guide plate moving device 60 includes a pair of second operating cylinders 61 and 61 which are set above and below the inserter moving device 40. The middle portion of the push rods 61a of the second operating cylinders 61 are supported through holders 62 on the above-described bracket 42, and the front ends of the push rods 61a are coupled to the guide plate 50. Hence, as the push rods 61a and 61a of the second operating cylinders 61 and 61 are moved back and forth, the guide plate 50 is moved back and forth along the central axis.

As was described above, the small-diameter sealing portion 3b of the boot 3 is mounted on the tapered shaft portion 30c of the inserter 30. When, under this condition, the second operating cylinders 61 and 61 are operated to move the guide plate 50 towards the cylinder body, the small-diameter sealing portion 3b is pushed toward the large-diameter shaft portion 30a of the inserter 30 while being expanded by the tapered shaft portion 30c. Finally, the small-diameter sealing portion 3b is mounted on the large-diameter shaft portion 30a of the inserter 30.

The inserter moving device 40, the guide plate 50, and the guide plate moving device 60 are provided in a slide mechanism 90 indicated by the two-dot chain line in FIG. 1 or 2. The inserter moving device 40, the guide plate 50, the guide plate moving device 60, and the inserter 30 held by the collet 47 of the inserter moving device 40 can be moved back and forth along the central axis of the cylinder body 4 by the push rod 91a of a third operating cylinder 91 which is coupled to the slide mechanism.

The first operating cylinder 41 of the inserter moving device 40 is coupled to the push rod 100a of a fourth operating cylinder 100 which is fixedly provided outside the slide mechanism 90, so that the inserter moving device 40 is moved back and forth along the central axis of the cylinder body 4, independently of the guide plate 50 and the guide plate moving device 60.

The first air supplying device 70 includes: a compressing machine 71 such as a compressor or blower; the first air passageway 72 in the collet holder 43; the second air passageway 73; and a supply pipe 74 through which the compressing machine 71 is connected to the first air passageway 74. The air compressed by the compressing machine 71 is blown out through the second air passageway 73 of the inserter 30.

The second air supplying device 80 includes: a compressing machine 81; a fifth operating cylinder 82 with a fixing board on the ends of the push rods 82a; an inserter block 84 held on the fixing board 83; and an inserter 85 connected to the end of the inserter block 84. The inserter 85 is made of an elastic material such as urethane resin. By the lifting operation of the fifth operating cylinder 82, the inserter 85 is engaged with the union hole 12 of the wheel cylinder 2, so that the air compressed by the compressing machine 81 is supplied into the cylinder hole 5.

The embodiment thus organized operates as follows.

First, the cylinder body 4 of the wheel cylinder 2 is held with the jig 20 in the above-described manner. The components except the boots 3 and 3 on both sides have been coupled to the cylinder body 4. The pistons 6 and 6 inserted in the cylinder body 4 are urged outward by a return spring 14 which is elastically set in the hydraulic pressure chamber 7, so that the sealing grooves 6c of the protruded end portions 6b of the pistons 6 are exposed outside the cylinder body 4 on both sides.

Before the collet 47 holds the inserter 30, the inserter moving device 40, the guide plate 50, and the guide plate moving device 60 are at their retracted positions because the slide mechanism 90 is pulled by the third operating cylinder 91. The collet cap 46, being pushed by the first operating cylinder 41, is moved towards the cylinder body 4, so that the inserting through-hole 47b of the collet 47 is expanded.

Each of the boots 3 to be coupled to the wheel cylinder 2 is mounted on the tapered shaft portion 30c of the inserter 30 with the large-diameter sealing portion 3a facing the large-diameter shaft portion 30a. After the boot 3 has been mounted on the inserter 30 in the above-described manner, the small-diameter shaft portion 30b is inserted through the inserting through-hole 50a of the guide plate 50 and the inserting through-hole 47b of the collet 47 into the first air passageway 73. Under this condition, the first operating cylinder 41 is operated to move the collet cap 46 in the direction which is opposite to the direction in which the cylinder body is located (hereinafter referred to merely as "backwardly", when applicable), and the small-diameter shaft portion 30b is chucked with the collet 47. As a result, the inserter 30 is set along the central axis of the cylinder body 4, while the boot 3 mounted on the tapered shaft portion 30c of the inserter 30 is brought into contact with the front end face of the guide plate 50 (as shown in FIGS. 1 and 2).

Figure 4:
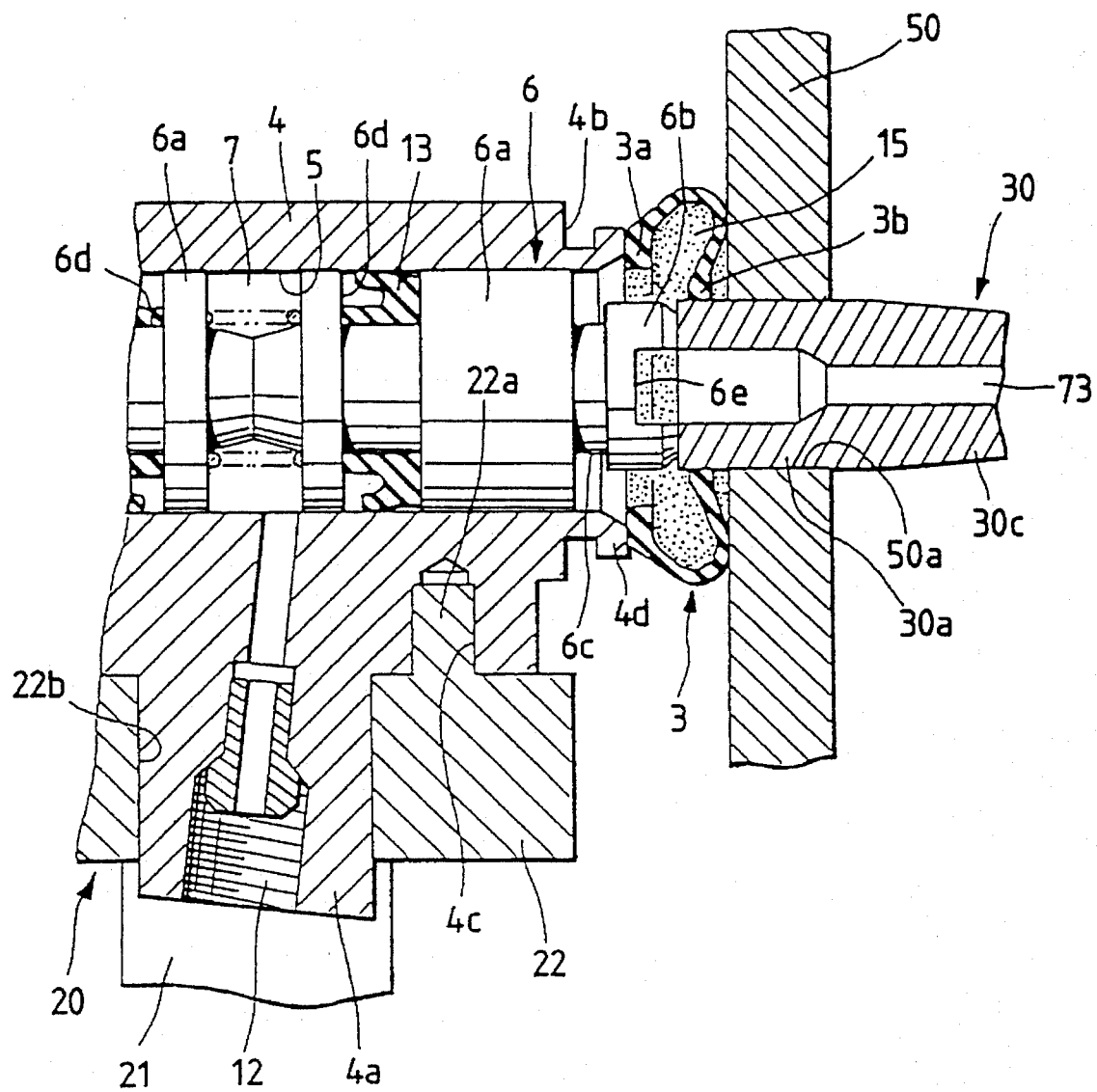
FIG. 4 is a sectional view showing an inserter and a piston which are abutted against each other during the boot mounting operation.

Thereafter, the third operating cylinder 91 is operated to push the slide mechanism 90, so that the inserter moving device 40, the guide plate 50, and the guide plate moving device 60 are moved, as one unit, towards the cylinder body 4 to cause the end face of the large-diameter shaft portion 30a of the inserter 30 to strike against the end face of the protruded end portion 6b of the piston 6 until the piston 6 is somewhat pushed into the cylinder hole 5. Before or after this operation, the guide plate 50 is moved towards the cylinder body by the first operating cylinder, so that the boot 3 mounted on the tapered shaft portion 30c of the inserter 30 is moved to the large-diameter shaft portion 30a, and the large-diameter sealing portion 3a is protruded over the large-diameter shaft portion 30a and then pressed against the end face of the cylinder body 4 as shown in FIG. 4. As a result, an air chamber 15 is formed between the cylindrical body 6a of the piston 6 and the end portion of the large-diameter shaft portion 30a of the inserter 30 with which the small-diameter sealing portion 3b of the boot 3 is engaged.

Figure 5:
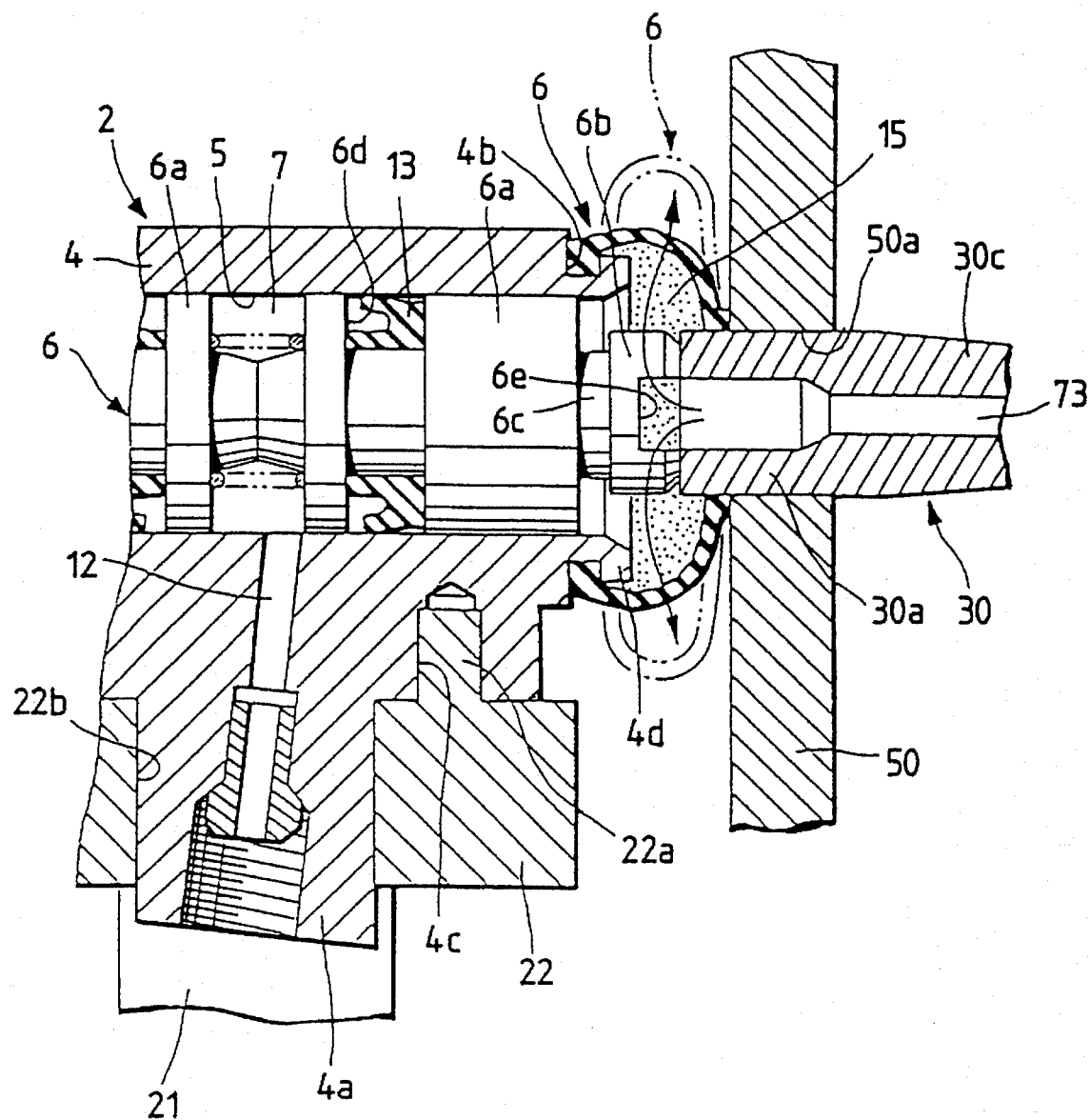
FIG. 5 is a sectional view showing the large-diameter sealing portion of the boot which is fitted in a sealing groove formed in the cylinder body.

When compressed air is provided by the compressing machine 71 of the first air supplying device 70, the compressed air is supplied through the second air passageway 73 of the inserter 30 and the slit 6e in the protruded end portion 6b into the air chamber 15, so that the large-diameter sealing portion 3a of the boot 3 is inflated outwardly by the compressed air as indicated by the two-dot chain lines in FIG. 5. The large-diameter sealing portion 3a thus inflated is moved over the periphery of the protruded end portion, and finally engaged with the sealing groove 4b of the cylinder body 4 as shown in FIG. 5. Thereafter, the compressing machine 71 is operated in the reverse direction, or an air discharging device (not shown) such as a valve is operated to discharge the air from the air chamber 15. As a result, the large-diameter sealing portion 3a is restored; i.e., contracted, thus being fitted in the sealing groove 4b of the cylinder body 4 as indicated by the solid lines in FIG. 5.

Thereafter, the fifth operating cylinder 82 of the second air supplying device 80 is operated to raise the push rods 82a thereby to engage the inserter 85 with the union hole 12 of the cylinder body 4. Under this condition, the compressing machine 81 of the second air supplying device 80 is operated to produced compressed air. The compressed air is supplied through the union hole 12 into the hydraulic pressure chamber 7 in the cylinder hole 5, so that the right and left pistons 6 and 6 in the cylinder hole 5 are pushed outwardly.

At the same time, the fourth operating cylinder 100 is operated to retract its push rod, so that the inserter moving device 40 is moved backwardly, away from the cylinder body. As a result, the large-diameter shaft portion 30a of the inserter 30 is pulled out backwardly (to the right in FIG. 6) leaving the boot 3 supported by the guide plate 50. As the inserter 30 is retracted, the piston 6 is moved outwardly.

Figure 6:
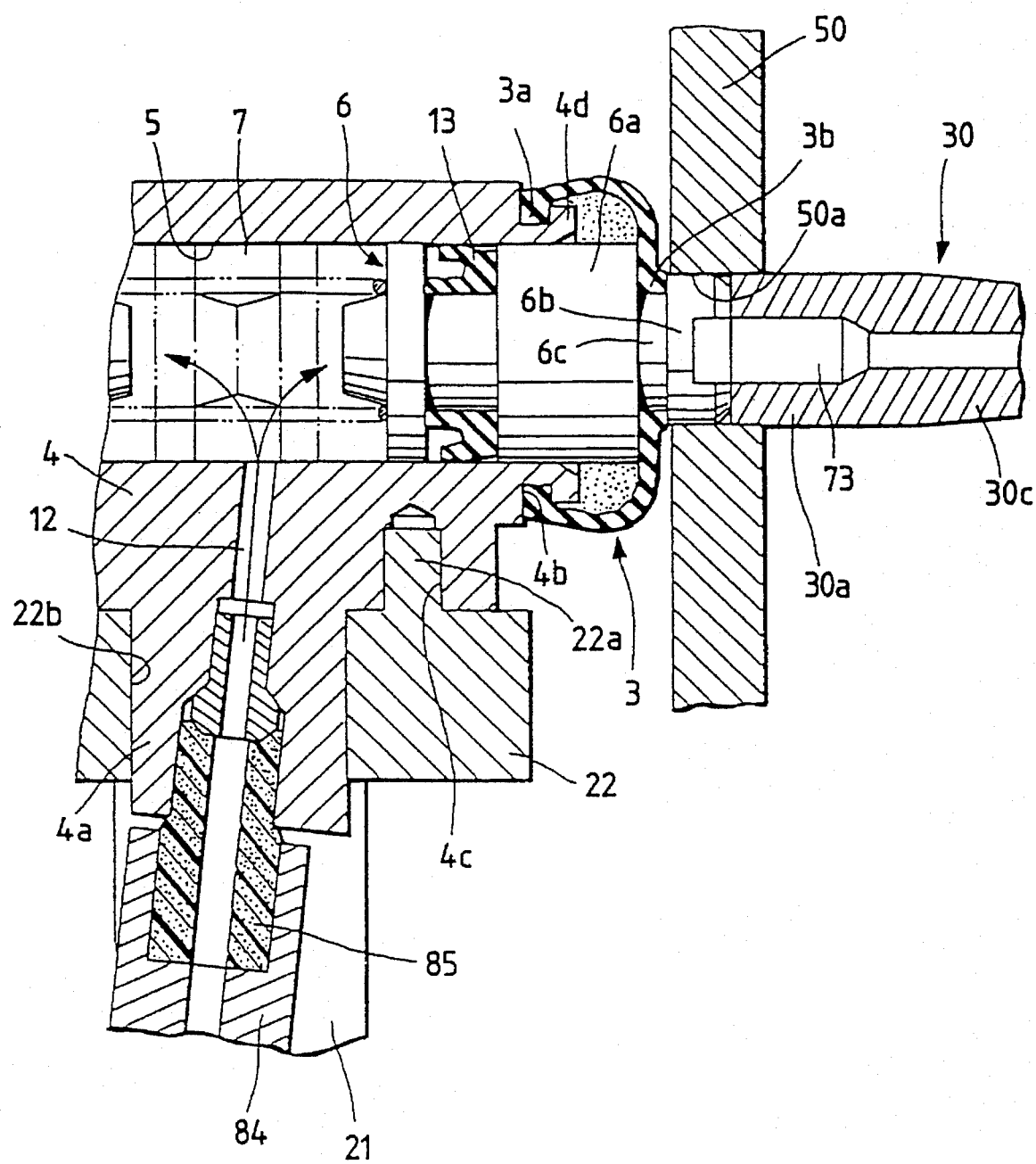
FIG. 6 is a sectional view showing the small-diameter sealing portion of the boot which is fitted in a sealing groove formed in the piston.

When the large-diameter shaft portion 30a of the inserter 30 is disengaged from the small-diameter sealing portion 3b of the boot 3, the protruded end portion 6b of the piston 6 is engaged with the small-diameter sealing portion 3b. The small-diameter sealing portion 3b engaged with the protruded end portion 6b is moved on the cylindrical surface of the protruded end portion 6b as the piston 6 is moved outwardly. When the small-diameter sealing portion 3b comes to the sealing groove 6c of the piston 6, it is contracted and fitted in the sealing groove 6c as shown in FIG. 6.

When necessary, the compressed air is supplied into the hydraulic pressure chamber 7 by the second air supplying device 80, and the fourth operating cylinder 100 is operated, so that the piston 6 and the inserter 30 are moved back and forth along the central axis of the cylinder body, whereby the large-diameter sealing portion 3a and the small-diameter sealing portion 3b are sufficiently fitted in the sealing grooves 4b and 6c.

The present invention has been described with reference to the wheel cylinder of the vehicle drum brake; however, the present invention is not limited thereby or thereto. That is, the technical concept of the present invention may be widely applied to cylinders on each of which the large-diameter sealing portion and the small-diameter sealing portion of the boot are to be mounted from outside.

As was described above, the two annular sealing portions of the boot are automatically mounted on the cylinder from outside according to the present invention. That is, when compared with the prior art in which the boot is manually mounted on the cylinder or only one of the two sealing portions of the boot is mounted on the cylinder, the present invention is advantageous in that the time required for mounting the boot on the cylinder can be greatly reduced. That is, the apparatus of the invention is high in productivity, and the product formed thereby is low in manufacturing cost. Furthermore, the burden on the worker is greatly decreased, and the sealing performance of the boot is less fluctuated; that is, it is stable at all times.

While there has been described a preferred embodiment of the present invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An automatic boot mounting apparatus for mounting a boot on a cylinder, said cylinder having a cylinder body including a cylinder hole and a first annular groove formed on an end of an outer surface thereof, and a piston accommodated in said cylinder hole of said cylinder body, said piston including a protruded end portion and a second annular groove formed on an outer surface of said protruded end portion, and said boot including a large-diameter sealing portion for being fitted in said first annular groove and a small-diameter sealing portion for being fitted in said second annular groove; said automatic boot mounting apparatus comprising:

an inserter including a large-diameter shaft portion which is equal in diameter to said protruded end portion of said piston, a small-diameter shaft portion which is smaller in diameter than said small-diameter sealing portion of said boot, a tapered shaft portion interconnecting said large-diameter shaft portion and said small-diameter shaft portion, and an air passageway extending axially through said shaft portions;

a slide mechanism for moving each of said inserter and said boot along a central axis of said cylinder body and toward said cylinder body, said slide mechanism including a guide plate axially movable relative to said inserter for moving said boot along a length of said inserter;

first air supplying means for supplying air through said air passageway into a space between said piston and said boot, to fit said large-diameter sealing portion in said first annular groove by inflating said boot outwardly; and second air supplying means for supplying air into said cylinder hole, to fit said small-diameter sealing portion in said second annular groove by pushing said piston outwardly from said cylinder body.

2. The automatic boot mounting apparatus of claim 1, wherein said slide mechanism comprises:

inserter moving means for holding said small-diameter shaft portion, and for moving said inserter along the central axis of said cylinder with said large-diameter shaft portion facing said cylinder;

said guide plate moving said boot mounted on said tapered shaft portion towards said large-diameter shaft portion; and guide plate moving means for moving said guide plate along said inserter.

3. The automatic boot mounting apparatus of claim 2, wherein said guide plate moving means comprises:

at least one guide plate push rod positioned parallel to said central axis and connected to said guide plate; and a guide plate operating cylinder associated with said at least one guide plate push rod.

4. The automatic boot mounting apparatus of claim 2, wherein said inserter moving means further comprises:

a collet for holding said small-diameter shaft portion; and a collet holder connected to said collet, including an opening for receiving said collet, wherein, when said small-diameter shaft portion is inserted into said inserter moving means, said collet is compressed by said collet holder and said inserter is held in place.

5. The automatic boot mounting apparatus of claim 1, further comprising a jig for holding said cylinder at a predetermined position.

6. The automatic boot mounting apparatus of claim 5, wherein said jig comprises:

a plurality of guide bosses supporting said cylinder;

a stand connected to said guide bosses; and a guide support connected to said stand and to said second air supplying means.

7. A system for mounting a boot on a cylinder, said cylinder having a cylinder body including a cylinder hole and a first groove formed on an end of an outer surface thereof, and a piston accommodated in said cylinder hole of said cylinder body, said piston including a protruded end portion and a second groove formed on an outer surface of said protruded end portion, and said boot including a first-diameter sealing portion for being fitted in said first groove and a second-diameter sealing portion for being fitted in said second groove, said system comprising at least two automatic boot mounting devices positioned on opposite sides of said cylinder body, each said automatic boot mounting device comprising:

an inserter including a first-diameter shaft portion which is equal in diameter to said protruded end portion of said piston, a second-diameter shaft portion which is smaller in diameter than said second-diameter sealing portion of said boot, a third shaft portion interconnecting said first-diameter shaft portion and said second-diameter shaft portion, and an air passageway extending axially through said shaft portions;

a slide mechanism for moving each of said inserter and said boot along a central axis of said cylinder body and toward said cylinder body, said slide mechanism including a guide plate axially movable relative to said inserter for moving said boot along a length of said inserter;

first air supplying means for supplying air through said air passageway into a space between said piston and said boot, to fit said first-diameter sealing portion in said first groove by inflating said boot outwardly; and second air supplying means for supplying air into said cylinder hole, to fit said second-diameter sealing portion in said second groove by pushing said piston in said cylinder hole outwardly from said cylinder body.

8. An apparatus for mounting a boot on a body and on a piston extending from said body, comprising:

a guide plate having a first opening;

an inserter positionable within said first opening and having an air passageway extended axially therethrough;

means for positioning said inserter within said first opening;

means for moving said guide plate along the length of said inserter;

means for supplying air through said air passageway; and means for supplying air to said body for extending said piston from said body, said piston having a first diameter, said boot including a first opening having a first diameter and a second opening having a second diameter for mounting on said piston, said inserter having a first shaft portion having said first diameter, a second shaft portion having a diameter smaller than said second diameter and a tapered third shaft portion interconnecting said first shaft portion and said second shaft portion, said guide plate for moving said boot axially along said inserter, said means for positioning said inserter for moving said inserter adjacent said piston such that said guide plate and said first and second means for supplying air cause said boot to be sequentially mounted on said body and then on said piston.

* * * * *